Patented July 30, 1940

2,209,316

UNITED STATES PATENT OFFICE 2,209,316

PURIFICATION OF STILL RESIDUE

Samuel G. Burroughs, Pittsburgh, and Frank W. Corkery, Crafton, Pa., assignors to Pennsylvania Industrial Chemical Corporation, a corporation of Pennsylvania No Drawing. Application July 5, 1938, Serial No. 217,580

3 Claims. (Cl. 260—81)

This invention relates to the recovery of coumarone-indene substances of resinous sort, from a still residue and from contaminating compounds of such still residue, and to purification of the still residue.

The still residue with which we are concerned is a substance residually produced in the fractionation and purification treatments of the light oil recovered in the by-product coking of coal. This light oil comes over in coal distillation. By far the greatest proportion of the light oil distills over before tar in by-product coking, and is recovered from the gases with which it comes over by being absorbed in a scrubbing oil, which scrubbing oil is usually a heavy cut of petroleum. This still residue contains polymers of resin-forming bodies in various stages of polymerization, some heavy monomers, traces of naphthalene, and various percentages of sulphates and sulphonates. It is a dark, viscous, oily substance deficient in drying qualities, and itself possessing but little utility in the arts. As it is commercially available, the still residue may be obtained from either of the following operations conducted upon the light oil.

Briefly to discuss this still residue, such still residue may be produced from the fractionation of light oil in initial, or "crude," stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates. The various still residues, because of the heat treatment, or acid purification treatment, or both of such treatments, to which the light oil is subjected, comprise a large percentage of polymers of the light oil unsaturates, such as coumarone and indene, in varying proportions. Usually the still residue is subjected in the by-product plant to a distillation for the removal of solvents and naphthalene. There is variation in the above-noted practice in different coking plants. Light oil is in some plants additionally recovered by distillation of the tar in which it is entrapped, not all of the light oil coming over during the initial distillation. This fraction of light oil recovered from the tar is contaminated with phenols, pyridine bases, and other typical tar ingredients, which however, are removed by a preliminary purification prior to the several typical fractionating and purifying treatments given above to which the light oil is subjected. The residues with which we deal may be considered, for all practical purposes, as free from tar ingredients, even though derived, or partially derived, by distillation from tar.

As still residue of this sort is commonly available commercially, it contains sulphonates from the acid purification and neutralization of the light oil, followed by the distillation in the "pure stills" which results in the production of a residue. These sulphonates are in the form of the alkaline and alkaline earth salts of sulphonates of light oil aromatics; and the alkaline and alkaline earth acid sulphonates of the light oil aromatics. Sulphate addition products are also present in the same mass of impurities, as are also sulphones resulting from dehydration of the sulphonates. All are herein included in the general term "sulphonates."

Assuming that the starting material is a still residue containing sulphonates, a solid resinous material may be obtained from the still residue by distillation, which distillation may be either straight distillation, vacuum distillation, steam distillation, or a steam and vacuum distillation. In distilling the sulphonate contaminated still residue, we have carried the temperature of distillation to such point, and have continued distillation for such time that there is distilled off the coal tar solvent content of the still residue, and all other of the more volatile ingredients, thus leaving resin and sulphonates in intimately commingled condition. We have found a still temperature of 550° F., when distillation is conducted with steam and under vacuum of about 20 inches of mercury, adequate to obtain distillation to a point at which a residual sulphonate contaminated resin is obtained. At atmospheric pressure and without the use of steam we have found adequate for distillation a still temperature of 575° F. or slightly lower.

If such distillation be conducted upon a still residue of the sort above described, which is not subjected to initial purification, the resultant solid product, or sulphonate contaminated resin, is a dark brown to blackish material, which differs definitely in important characteristics from a coumarone type resin which does not contain sulphonates. It has an ability to resist flowing when raised to its softening temperature, possessing a high viscosity at such temperatures. When distillation is carried to a point at which substantially all the dimers of the light oil aromatics have been drawn off, and the material recovered as solid resin, this solid resin usually has a melting-point approximately as high as 125° C. (ball and ring method). The color depth is about 17 or 18 on the coal tar resin color scale.

While usable for some purposes, this sulphonate contaminated resin obtained as the solid residuum from the distillation of unpurified still residue, has qualities which render it unsuitable for many purposes, amongst which is its use as the resin content of a binder composition for mastic tile, linoleum, or the like. This is for the reason that its penetration at 115° F. (the standard upper temperature for determining penetration in mastic tile binder materials), is so high that it is difficult to combine with it in a tile binder sufficient plasticizer to give the binder composition adequate penetration at 77° F. without rendering its penetration at 115° F. too high. A tile made with resin from unpurified still residue also tends to water-spot. If the still residue, either in its substantial entirety or as topped, is oxidized by blowing either alone or in conjunction with an oxidizable oil, it is usually desirable that for such purpose also it be purified initially of its sulphonate content.

Our present discovery relates specifically to improved procedure for recovering in sulphonate-free condition coumarone and indene polymers contained in such still residue; and may be considered to constitute improvement upon the procedure disclosed in co-pending application Serial No. 182,804, filed December 31, 1937, by Frank W. Corkery, one of the joint inventors herein. This recovery may be effected by either decomposition of the sulphonates as a part of the initial body of still residue, accompanied by removal of the non-resinous products of decomposition, or may be done by decomposing the sulphonates after separation from the still residue in purifying the latter. In the first instance, which may be considered primarily a purification treatment, economy in procedure considered purely as such is attained, while additional economy is effected by recovering in purified form a content of resins or resin-forming bodies, which initially formed part of the contaminating sulphonates themselves.

Primarily we have discovered that by reaction with alkaline reagents the metallic sulphonates of coumarone and indene can be decomposed to give a particularly pure and complete recovery of the coumarone and indene substances therefrom, and have discovered a particularly efficient decomposition process involving the use of alkaline reagents. The procedure hereinafter disclosed, and specifically and variantly exemplified, may be substantially varied in detail, and it is to be understood that the specific disclosure as to reagents and procedure is to be considered a disclosure of preferred conditions under which purification and recovery may be most efficiently conducted.

Briefly to summarize our invention in its preferred embodiments, we take a still residue, of the sort above described, as our starting material. The still residues as commercially obtainable contain from 11% to 15% sulphonates, but in utilizing different lots of still residue, and still residue from different sources of supply, we have found that it has preponderantly a sulphonate content of approximately 14% the total weight of the still residue. This still residue we thin with a solvent therefor, utilizing one of the lower boiling aromatic or aliphatic solvents, or a mixed aromatic and aliphatic solvent; desirably bringing it to a gravity slightly less than that of water, such for example as a gravity of 0.97. We then mix with the still residue solution a water solution of an alkaline reagent having a weaker negative radical than the sulphonate or sulphate radicals present in the "sulphonate" content of the still residue and desirably use an alkaline reagent which precipitates alkaline earth salts in non-flocculent form.

The resultant reactions, which for their completion appear to require moderate heating, result in a decomposition of the sulphonates per se, and also of the sulphates, sulphones (dehydrated sulphonates), and sulphate-additive compounds included in the term "sulphonates," with precipitation of the water-insoluble inorganic reaction products, and with the formation of a water solution of the water-soluble inorganic and organic products. Upon stratification and decantation, still residue is recovered, purified of its sulphonate content, but enriched by the coumarone and indene substances initially in chemical combination in the sulphonates. As this resin content of the sulphonates constitutes about 9% the initial weight of the still residue, the recovery of a substantial part of it is a matter of importance.

In dealing with sulphonates which have been separated from the remaining body of the still residue by a purification treatment, we dissolve the sulphonates in a low boiling aromatic solvent, such as refined solvent naphtha, in preparation for the purification and recovery reaction, and then proceed in the manner outlined above. The following are examples illustrating preferred procedure under our invention, namely a procedure in which raw, sulphonate-contaminated, still residue is treated for decomposition of its sulphonate content in situ, with separation of the inorganic products of reaction from the organic resins or resin-forming products released from chemical combination by the reaction.

EXAMPLE No. 1

260 gallons of the raw, sulphonate-contaminated, still residue was diluted with 180 gallons of mineral spirits, that is a petroleum naphtha distilling within the range of 300° F. to 400° F. This dilution brought the gravity of the still residue to approximately 0.97. A sodium carbonate solution was made by dissolving 117 pounds of sodium carbonate in 100 gallons of water.

Both the still residue blend, and the sodium carbonate solution were heated separately to a temperature of about 90° C., and the alkaline solution and the still residue solution were mixed while maintaining the temperature at about 90° C. The mixture was stirred for about thirty minutes, and was then allowed to settle, without permitting any abrupt temperature drop. By reaction, the calcium and magnesium present in the sulphonates were recombined as a precipitate of insoluble calcium and magnesium carbonates. Upon stratification, the water layer, underlying the still residue solution was found to be a deep brown. The calcium and magnesium precipitate was drawn off, as was also the water layer underlying the still residue solution. The still residue solution was then washed with hot water until the wash water was observed to be clear. It may be here noted that the double decomposition in the reaction mixture involved an interchange with calcium and magnesium radicals to leave water-soluble sulphonates and alkaline sulphates, formed by decomposition of a portion of the sulphonates.

Following precipitation, decantation, and washing, the purified still residue is in condition to be distilled for the recovery of solid coumarone-indene resin and intermediate products, such as the dipolymer oil consisting preponderantly of dimers of coumarone and indene; or to be subjected, with or without topping, to an oxidation treatment by blowing it either alone or in conjunction with an oxidizable oil or a natural non-mineral pitch, to give variously useful products.

When the still residue is distilled to a stage at which a resin solid at normal room temperature and higher, is recovered, such solid resin has a color intensity of from about 10 to 14 on the coal tar resin color scale, in accordance with the melting point to which the resin is brought.

While there may be certain reactions involved in the treatment which we have not as yet identified, we consider that a number of reactions which take place do so in accordance with the following formulae:

*Reaction No. 1—Sulphonate*

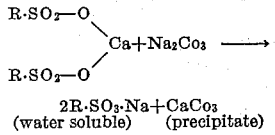

2R·SO₃·Na+CaCo₃
(water soluble) (precipitate)

*Reaction No. 2—Acid sulphonate*

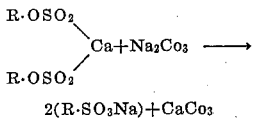

2(R·SO₃Na)+CaCo₃

*Reaction No. 3—Sulphate additive*

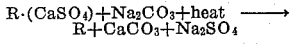

*Reaction No. 4T—Sulphone*

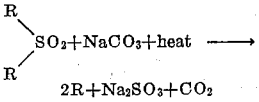

2R+Na₂SO₃+CO₂

In these formulae "R" represents a light oil aromatic, which for all practical purposes may be considered to be coumarone or indene. It will thus be seen that, with moderate heating, a resin content is recovered as one of the reaction products of Reactions 3 and 4. Taking the sum of the reaction products, the inorganic product is preponderantly insoluble non-flocculent calcium carbonate. The sodium sulphonate, formed as a product of Reactions Nos. 1 and 2, is water-soluble, and is drawn off in the water layer after the batch has settled and stratified.

Example No. 2

260 gallons of the raw, sulphonate-contaminated, still residue was diluted with 200 gallons of refined solvent naphtha; that is, the aromatic solvent naphtha recovered by purification and fractionation from the coal-derived light oil which has been above described. 168 pounds of sodium sulphite was dissolved in 100 gallons of water, and both the still residue blend and sodium sulphite solution were separately heated to a temperature of about 90° C. They were then mixed, and the mixture was stirred, while maintaining a temperature of about 90° C., for about twenty-five minutes. The mixture was then allowed to settle and stratify without any abrupt drop in temperature.

After stratification, separation and recovery were conducted by the same steps as described in Example No. 1. When distilled to the stage of yielding solid resin, such resin was found to have a color intensity of from about 10 to 14 on the coal tar resin color scale in accordance with the melting point to which the resin is brought. We have observed that, in the absence of repeated washing, purification is not as complete in using an aromatic diluent for the still residue as when an aliphatic diluent is used. The reason for this less perfect separation is that with an aromatic diluent, there is a tendency for sulphonates which may escape decomposition to be dissolved in the still residue blend, whereas any such undecomposed sulphonates tend to be thrown out when the still residue is diluted with an aliphatic solvent therefor, in which solvent the sulphonates are insoluble. For most purposes for which the purified coumarone and indene, recovered from our process, is to be used, we, therefore, prefer to dilute the still residue with a low boiling aliphatic hydrocarbon liquid, such as the petroleum naphtha of Example No. 1. Complete purification of the still residue is particularly desirable when resin or pitch, recovered or made from the still residue, is to be used in mastic tile or like products. This is for the reason that even a relatively small proportional inclusion of sulphonates tends to cause water spotting in a mastic tile.

It has been noted that the alkaline reagent in this example is sodium sulphite (Na₂SO₃), rather than sodium carbonate (Na₂CO₃). Formulae for reactions in accordance with this example need not be specifically given, since in constructing them it is necessary merely to replace the CO₃ radical of Example No. 1 with the sulphite (SO₃) radical.

Example No. 3

260 gallons of raw, sulphonate-contaminated, still residue with 190 gallons of a mixed aromatic and aliphatic solvent, consisting of about 70% petroleum naphtha was used as a diluent in Example No. 1, and about 30% of the coal-derived naphtha used in Example No. 2. A sodium hydroxide solution was made by dissolving 95 pounds of sodium hydroxide in 100 gallons of water. Both the still residue blend and the sodium hydroxide solution were heated separately to about 90° C. and were mixed. While the temperature of about 90° C. was maintained, the mixture was stirred for approximately thirty minutes. Without permitting any marked temperature drop, the solution was then filtered to remove the precipitate of inorganic decomposition products. Filtration is in this example necessary, because the calcium products of reaction with the sodium hydroxide are in the form of a flocculent precipitate which does not readily settle upon standing.

After filtration, the batch was permitted to stratify, and the water layer underlying the still residue solution was drawn off; and the solvent layer was washed with water, and was then distilled to the stage of yielding solid resin. The resin was found to have a color intensity of from about 10 to 14 on the coal tar resin color scale in accordance with elevation of the melting point. The hydrocarbon diluent for the still residue used in the example is representative of a diluent resulting from repeated use of an aliphatic diluent, since such diluent tends to pick up some of the lower boiling solvent end of the still residue which it is used to dilute. It represents approximately the highest proportion of aromatics which may be included in the diluent, while insuring against an appreciable retention of sulphonates.

The reactions of Example No. 3 may readily be made up, merely by replacing Na₂CO₃ by 2NaOH, two hydroxyls thus replacing one carbonate radical in the formulae.

While as indicated certain alkaline reagents are more desirable than others, we have found that we may with reasonable satisfaction utilize any such reagent, the negative radical of which is weaker than the sulphonate and sulphate radicals. We have illustrated above the exemplary use of sodium carbonate, sodium sulphite, sodium hydroxide, and we have also used successfully for example sodium silicate, and the corresponding potassium and ammonium salts of all these compounds. We have also employed successfully phosphates of sodium, potassium, and ammonium.

It is, in practice, important to utilize moderately elevated temperatures not only to expedite the reactions, but also to carry them to completion, in practical effect wholly to purify the still residue and to obtain substantial resin recovery from the sulphonates. In this connection we have found that at temperatures no higher than 40° C. reaction proceeds rather slowly, but that it takes place rapidly when a batch temperature of 100° C. is approached. The temperature of about 90° C., as employed in the examples given above, is preferred, since such temperature, while well below the boiling point of the water in the batch, is sufficiently high to insure rapid progress of the reactions.

While temperature of moderate elevation is necessary in effecting satisfactory purification of the still residue, and in recovering from its sulphonate content an appreciable quantity of resin, or resin-forming material, some purification can be effected at normal room temperature, or even at lower temperatures. As a substantial reduction in its proportional content of sulphonates so improves the still residue as to render resin recovered from it, or an oxidation product of the still residue, useful for an increased number of purposes, a useful result can be obtained by agitating the still residue with a solution of one of the suitable alkaline reagents for a relatively long treating period, without the application of heat. In connection with the temperature of the batch subjected to reaction, it may be noted that the separate heating of the still residue blend and of the alkaline solution, as given in the examples, is a mere feature of operating expediency, and has no influence on the results obtained from our method.

It has been noted above that by our method we may recover the resin content of sulphonates which have been already separated from the remaining body of still residue, and we shall, therefore, give a single example of such procedure, it being understood that as to the reagents employed, and the general steps followed, this variant of our process closely parallels the simultaneous purification of still residue and recovery of sulphonate-contained resin by decomposing these sulphonates in a body of the still residue. This example is as follows:

EXAMPLE No. 4

2000 pounds of relatively dry sulphonate sludge, removed by precipitation from a raw, sulphonate-contaminated still residue was dissolved in 300 gallons of refined solvent naphtha. The solution was heated to about 90° C. A solution of 575 pounds of sodium carbonate in 500 gallons of water was made and also heated to a temperature of about 90° C. After making a working mixture of the sulphonate solution and the sodium carbonate solution, the procedure was identical with that described in Example No. 1 given above, and the same reactions were involved in the treatment.

Upon distillation of the purified still residue solution to a point at which solid resin was recovered, the resin was found to have a color intensity of about 10 to 14 on the coal tar resin color scale in accordance with elevation of the melting point of the resin. The separation is not quite so clean as in Example No. 1, but corresponds rather to the separation effected in Example No. 2. This is for the reason, previously explained, that in our process the use of an aromatic solvent results in a separation less complete than that effected when an aliphatic solvent is used. When our method is, as in Example No. 4, practiced upon a sulphonate which has been previously separated from the remaining body of still residue, to recover the resin contained in such sulphonate, it is necessary that solvent preponderantly aromatic be used to dissolve the sulphonates.

It is to be understood that, in conducting the treatment in the body of a raw, sulphonate-contaminated still residue, the step of dilution is not an absolute necessity. Thus, less desirably, precipitate regardless of its degree of flocculence may be filtered from the batch, and the water content of the batch may be floated on the still residue. There is some danger of emulsification during the reaction treatment and subsequent washing, if the still residue is undiluted. All the coumarone and indene substances recovered by so practicing our method as to obtain substantially complete purification may be brought to a melting point of about 125° F., (ball and ring method) without increasing the color intensity beyond a 14 color on the coal tar resin color scale.

We claim as our invention:

1. The herein disclosed method of purifying liquid aromatic still residue from the sulphuric acid purification, neutralization, and distillation of light oil derived in the by-product coking of coal of sulphonates resultant from such treatment and which comprise alkaline earth sulphonates of coumarone and indene, which consists primarily in decomposing the sulphonates in the body of still residue by reaction under moderate heating to a temperature below the boiling point of water with a water solution of an alkaline reagent.

2. The herein disclosed method of purifying liquid aromatic still residue from the sulphuric acid purification, neutralization, and distillation of light oil derived in the by-product coking of coal of sulphonates resultant from such treatment and which comprise alkaline earth sulphonates of coumarone and indene, which comprises the steps of diluting the still residue by the addition of a low boiling hydrocarbon liquid, and while heating the batch to a moderate temperature below the boiling point of water decomposing the sulphonates of the still residue by reaction with a water solution of an alkaline reagent.

3. The herein disclosed method of purifying liquid aromatic still residue from the purification and distillation of light oil derived in the by-product coking of coal of metallic sulphonates resultant from purification of the light oil in accordance with the procedure of claim 2 in which the low boiling hydrocarbon liquid diluent for the still residue is preponderantly an aliphatic hydrocarbon in which the sulphonates are insoluble.

SAMUEL G. BURROUGHS.
FRANK W. CORKERY.